US000002017H

(19) United States

(12) Statutory Invention Registration (10) Reg. No.: US H2017 H

Repperger et al. (43) Published: Apr. 2, 2002

(54) VIRTUAL REALITY FORCE EMULATION

(75) Inventors: Daniel W. Repperger; Michael J. Krier; Kurtis R. Johnson, all of Dayton, OH (US); David C. Johnson, Gilford, NH (US)

(73) Assignee: The United States of America as represented by the Secretary of the Air Force, Washington, DC (US)

(21) Appl. No.: 09/053,850

(22) Filed: Apr. 2, 1998

(51) Int. Cl.[7] ..... G09G 5/08

(52) U.S. Cl. ..... 345/161

(58) Field of Search ..... 345/161, 157, 345/156, 158, 8, 169

(56) References Cited

U.S. PATENT DOCUMENTS

| | | | | | |
|---|---|---|---|---|---|
| 4,842,607 | A | | 6/1989 | Repperger et al. | 623/24 |
| 4,913,000 | A | | 4/1990 | Wyllie | 74/523 |
| 5,354,162 | A | | 10/1994 | Burdea et al. | 414/5 |
| 5,389,865 | A | | 2/1995 | Jacobus et al. | 318/568 |
| 5,459,382 | A | | 10/1995 | Jacobus et al. | 318/568.11 |
| 5,576,727 | A | | 11/1996 | Rosenberg et al. | 354/179 |
| 5,587,937 | A | | 12/1996 | Massie et al. | 364/578 |
| 5,739,811 | A | * | 4/1998 | Rosenberg et al. | 345/161 |
| 5,767,839 | A | * | 6/1998 | Rosenberg | 345/161 |
| 5,805,140 | A | * | 9/1998 | Rosenberg et al. | 345/161 |
| 5,898,599 | A | * | 4/1999 | Massie et al. | 364/578 |
| 5,929,846 | A | * | 7/1999 | Rosenberg et al. | 345/161 |
| 5,959,613 | A | * | 9/1999 | Rosenberg et al. | 345/161 |
| 6,088,017 | A | * | 7/2000 | Tremblay et al. | 345/156 |

* cited by examiner

*Primary Examiner*—Michael J. Carone

(74) *Attorney, Agent, or Firm*—Gina S. Tollefson; Gerald B. Hollins; Thomas L. Kundert

(57) ABSTRACT

Multi-dimensional, non-linked method and apparatus for producing a simulated feeling of force on a preselected location on a human operator in a synthesized environment accomplished by generating a first, constant, stationary electromagnetic field and a second, varying electromagnetic field local to the human operator. The variance of the second electromagnetic field is controlled by electrical currents which are responsive to parameters describing the position and orientation of said preselected location on the human operator and such variance results in attraction and repulsion of the first and second electromagnetic fields emulating a feeling of force on the human subject.

17 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VIRTUAL REALITY FORCE EMULATION

RIGHTS OF THE GOVERNMENT

The invention described herein may be manufactured and used by or for the Government of the United States for all governmental purposes without the payment of any royalty.

BACKGROUND OF THE INVENTION

This invention relates to the field of generating forces in a virtual reality setting and more specifically to the field of generating forces in a virtual reality setting without physical attachment to a reference source.

Virtual reality simulators are widely used for training in space, aviation and large vehicle driving operations where a specific environment is simulated so the trainee can learn and practice appropriate responses. The more realistic the simulated environment, the more realistic the responses learned by the trainee so the trainee's performance during a real-time operation is superior. Training in virtual reality simulators is more practical and less costly than using real-time operational equipment. Virtual reality simulators simulating a variety of environments are also widely used for recreational purposes.

To make the simulated environment as realistic as possible, there is interest in producing a feeling of force or proprioceptive feedback to the human operator as he tries to interact in the virtual environment. In most operational environments, where an operator receives a feeling of force on one or more parts of the body, there is no connection or attachment from the part of the body receiving the feeling of force to any other objects. Most virtual reality systems simulating force, however, must attach or link the part of the body receiving the force to a reference frame and the feeling of attachment minimizes the realism of the simulation.

Known systems operate under an action-reaction scenario based on the traditional Newton's third law concept of bodies in contact in which the equipment attached to the human subject is also attached to either a spring or other force reflecting coupling system or possibly to a track where its motion can be carefully controlled. Attaching a human subject to a spring or other force reflecting coupling system minimizes the effectiveness of the simulator when such attachment or coupling does not occur in an operational environment. When an attached or tethered force reflecting device is used in today's modem virtual reality simulation systems, there is a loss of realism as the human becomes aware of his tethering to a local stationary frame.

It is known to have force reflection in virtual reality systems in multiple, as opposed to single dimensions, thus, producing a more realistic force feeling. However, all known systems in the art are arranged so that a tether, ground source or reference frame is attached to the human subject.

One goal of the invention is to capitalize on the concept of an "action at a distance" method of reflecting forces as opposed to the traditional Newton's third law concept of "action-reaction" with bodies in contact as is used in devices known in the art. The "action at a distance" concept is successfully employed in the virtual reality environment by using electromagnetic fields and forces in three dimensions. The electromagnetic fields generate the force feeling on the human operator without the human operator being attached or connected to a reference source, thereby increasing the realism of the simulation.

SUMMARY OF THE INVENTION

Multi-dimensional, non-linked method and apparatus for producing a simulated feeling of force by generating a first, constant, stationary electromagnetic field and a second, interacting electromagnetic field local to the human operator. The second electromagnetic field is varying and is controlled by electrical currents which are responsive to parameters describing the location of the human operator and such variance results in attraction and repulsion between the first and second electromagnetic fields producing a non-linked magnetic field force on the human subject.

An object of the present invention is, therefore, to provide a magnetic field force to a human subject.

Another object of the invention is to provide a magnetic field force to a human subject with the human subject free from any attachments or links to a reference frame.

Another object of the invention is to provide a feeling of force to a human subject for complete immersion in a virtual reality environment.

Another object of the invention is to provide a non-linked magnetic field force to a preselected location or perception point on a human subject.

Another object of the invention is to provide a multi-dimensional magnetic field force to a human subject free from any attachments to a reference frame.

Another object of the invention is to provide a multi-dimensional non-linked magnetic field force to a preselected location on a human subject for complete immersion in a virtual reality environment.

Additional objects and features of the invention will be understood from the following description and the accompanying drawings.

These and other objects of the invention are achieved by a non-linked method for providing a feeling of force to a human operator comprising the steps of:

- generating a first, constant, stationary electromagnetic field;
- sensing position and three-dimensional orientation of said human operator relative to said first, constant, stationary electromagnetic field;
- producing a second, varying electromagnetic field local to said human operator responsive to position and three-dimensional orientation of said human operator;
- directing a force on said human operator resulting from attracting and repulsing forces between said first and second electromagnetic fields.

DETAILED DESCRIPTION

Figure 1:
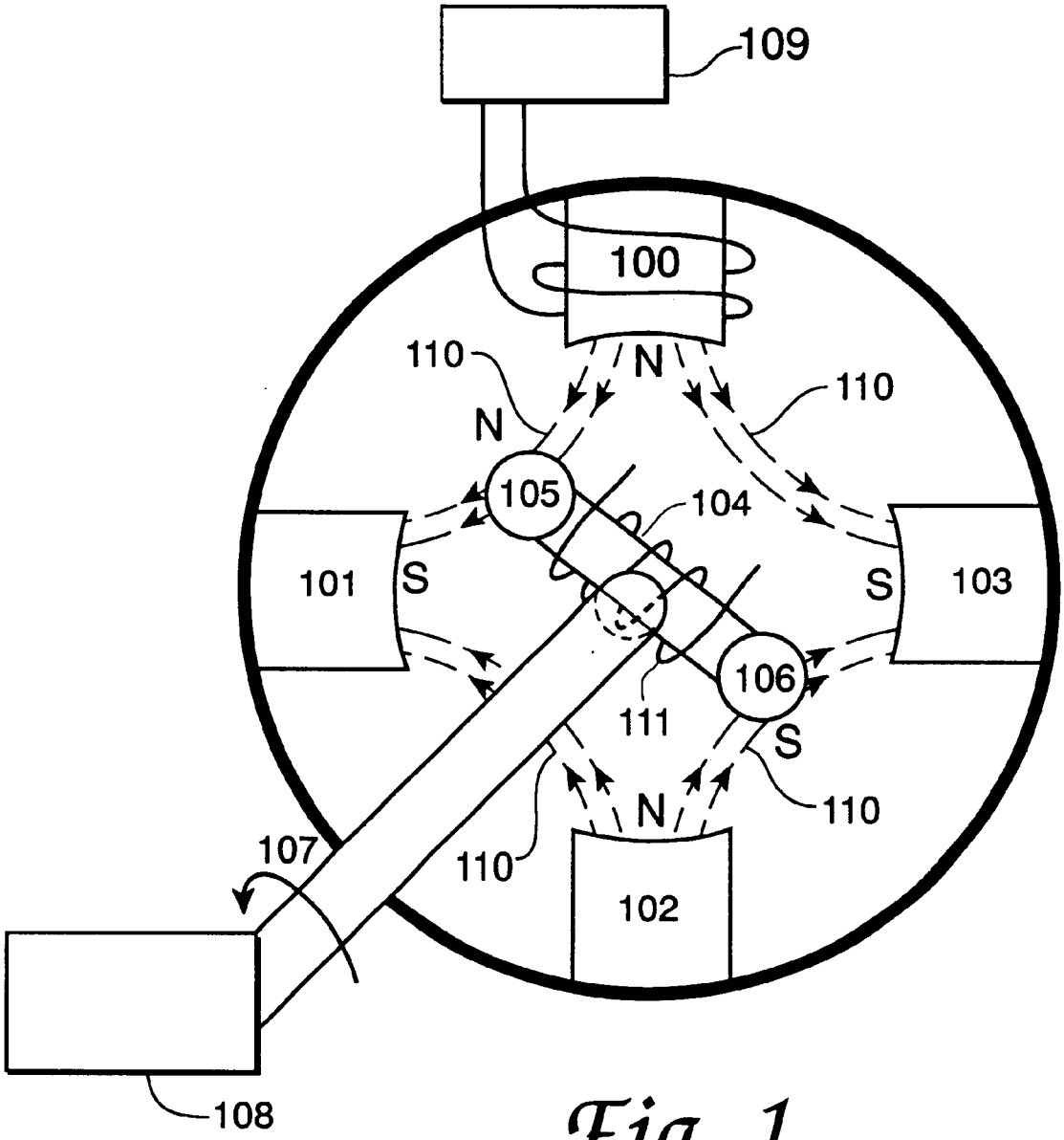
Fig. 1 PRIOR ART
FIG. 1 is a schematic diagram of a stator and rotor arrangement used in a DC motor in the prior art.

The invention may be better understood by first considering the basic concepts of electromagnetic interaction and force generation, as is employed in a DC motor, for example, and then extrapolating such concepts to the present invention. FIG. 1 shows a prior art DC motor that is known in the art. In FIG. 1, the stationary part of the motor, or the stator, is shown to include the magnetic poles at 100, 101, 102 and 103. The rotating part of the motor, or the rotor, is shown at 104. The mechanical load rotated by the motor is shown at 108. The stator poles, 100, 101, 102 and 103 remain stationary and have constant magnetic polarities associated with each of them, polarities controlled via external power excitation as indicated at 109. The magnetic field at poles 100 and 102 have a North magnetic polarity and the magnetic field at poles 101 and 103 have a South magnetic polarity. The lines of flux that become generated by these opposite magnetic polarities are indicated at 110.

The rotor, indicated in FIG. 1 at the center of the motor diagram by the barbell type device at 104, has a North magnetic pole shown at 105 and a South magnetic pole shown at 106. It is generally known in the area of electromagnetics that the South pole 106 is attracted to the North pole 102 and conversely. Also, if a North pole encounters another North pole, the two poles repel. This repulsion also occurs if a South pole encounters a South pole. In the instant shown in FIG. 1, the rotor 104 at the pole 105 is therefore being repelled by the stator at pole 100 and simultaneously being attracted to stator pole 101. This tends to produce rotation in a counter-clockwise direction. When the rotor pole 105 arrives at the stator pole 101, the currents in the rotor winding, shown at 111 are changed such that the polarity of pole 105 is changed from North to South. Since the rotor 104 was already moving, the additional repulsion between poles 101 and 105 will now move the rotor further in a counterclockwise motion towards stator pole 102. Recall stator pole 102 has a North polarity and pole 105 of the rotor (now with a South polarity) will then be attracted to stator pole 102. This motion continues with the polarity of the rotor poles changing every quarter cycle as the rotor moves in the counter clockwise manner shown at 107.

The rotor 104 is often attached to a load, a load generally depicted at 108 in FIG. 1, thereby the initial electrical energy input to the motor device is transformed into mechanical energy of load rotation. The device thus described is one-dimensional and functions in a planar type of movement. The DC motor of FIG. 1, therefore, may be considered to demonstrate the concept of "action at a distance", a method of force generation in which mechanical energy is transferred to the environment without any objects or surfaces coming into direct contact with one another. This is different from the traditional Newton's Third Law "action-reaction" scenario in which an object reacts to a given force through direct contact.

Figure 3:
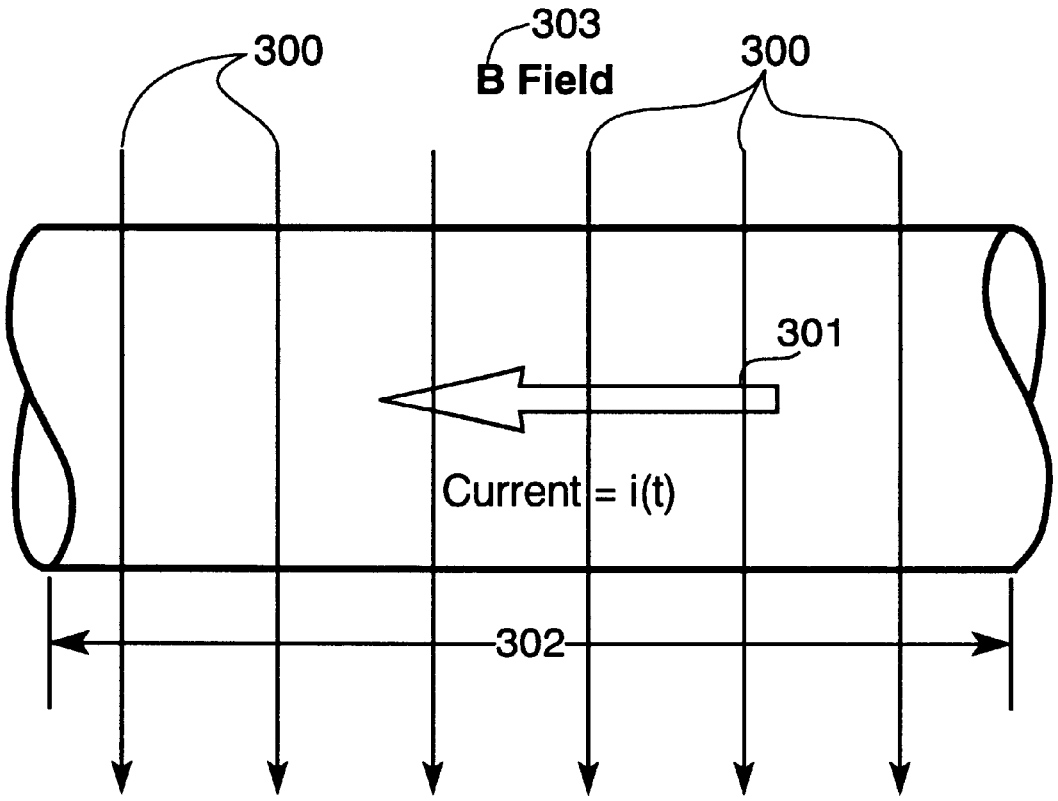
FIG. 3 is a schematic diagram showing force developed on a conductor in an electromagnetic field.

To better understand what other variables may influence the force generated via electromagnetic interaction, and hence better understand the invention, it is worthwhile to examine how a force can be produced on a single electrical particle by its movement in an electromagnetic field. From the basic principles of physics, the force acting on a charge q, when moving with a velocity v in an external field, can be described by the relationship:

$$F=q\ v\times B \qquad \text{(Eq. 1)}$$

Where the vector v is a velocity vector indicating the direction of the charge q relative to the external (constant) B field. The variable B is the magnetic induction vector that has units of Webers/meter$^2$. The cross product term x indicates that the force acting on the charge q is at right angles to both the v and B vectors. Thus, the force generated is proportional to the quantity of charge, its velocity, the intensity of the external B field, and the orientation between v the vector and the B field. To illustrate this basic principle of physics, consider FIG. 3, which illustrates the relationship of Eq. 1 for the flow of many charges q. FIG. 3 shows a magnetic field B at 303, current at 301 and conductor length at 302. In FIG. 3, the flux lines of the B field are shown at 300, a current is shown at 301 moving from right to left in a conductor whose length is illustrated at 302. The current i(t), shown at 301, is a summation of charges and the force, F, on the conductor can be expressed by the relationship $$F=i(t)\ L\times B \qquad \text{(Eq. 2)}$$

Where L is a vector indicating the direction of the current i(t). Eq. 2 is similar to Eq. 1 but applies for multiple charges and demonstrates the dependency of the force developed on the quantity and orientation of the current as well as the length of the conductor L affected in the external B field. The principle of the operation of a force generated on a conductor as depicted in FIG. 3 provides a basis for all types of force generation in electromagnetic devices including electric motors as shown in FIG. 1. The effect could also be illustrated through the interaction of two electromagnetic fields, that is, the external field having flux lines at 300 in FIG. 3 and a field generated by the current shown at 301 in FIG. 3 opposing the external field at 300. This is the basis of force generation for the non-linked magnetic field force system of the invention.

Figure 2:
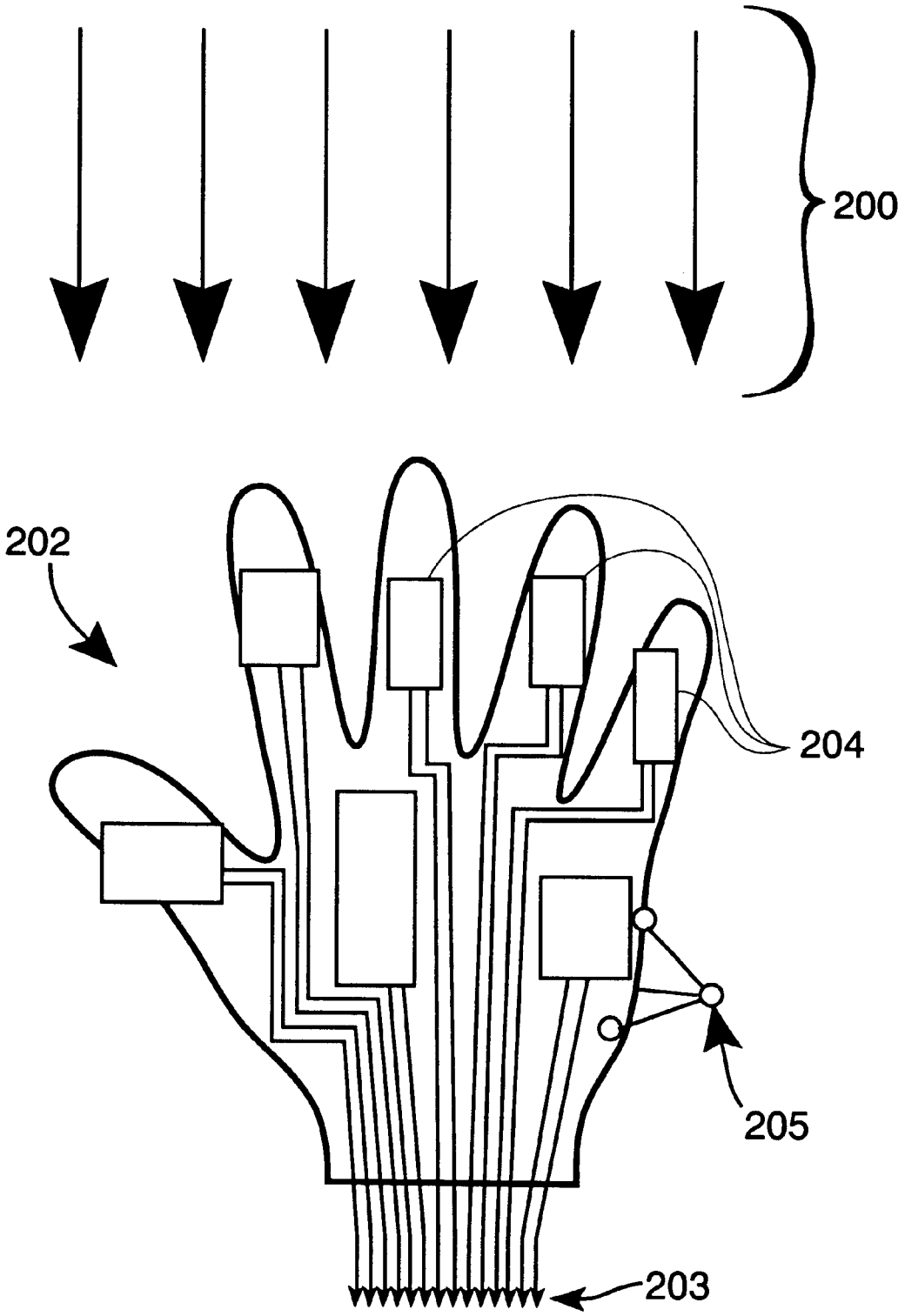
FIG. 2 is a frontal view of a glove type untethered virtual reality force emulator apparatus in accordance with the invention.

This effect may be extrapolated to an arrangement of the invention involving a glove device in a virtual reality simulation as shown in FIG. 2 where the external magnetic field shown at 200, and the glove device generally shown at 202 operates in a magnetic field. Force actuators are shown at 204. An attached microprocessor, such as is shown connected at 203 in FIG. 2, is responsible for computing the actual position and orientation of the body part, a hand in the arrangement of FIG. 2, to institute necessary currents in the force actuators. Referring to the description of the DC motor, the external field 200 remains constant as do the stator poles at 100, 101, 102 and 103 in FIG. 1. The rotor, at 104 in FIG. 1, has a current coil therein whose current valued is changed, this in turn changes the polarity of the rotor poles. A similar action occurs in the force actuators 204 on the glove device in the arrangement of FIG. 2. The current within the force actuator changes value, which in turn changes the magnetic field local to the glove device. Assume for example, that a feeling of force is desired on the glove-type device, the actual orientation of the glove-type device is determined by the microprocessor, which obtains position and orientation information in the form of electrical signals from the goiniometers at 205. After data indicating the three-dimensional position and orientation of the glove-type device with respect to the magnetic field 200 are communicated to the microprocessor, the microprocessor then computes the value and vector direction of the magnetic field local to the glove-type device needed to cause the static electromagnetic field to repulse the local magnetic field and emulate a feeling of force in the intended direction on the glove-type device. A sample software algorithm is provided as Appendix A, which provides means for the microprocessor to coordinate and keep track of position and orientation of the sensors and actuators. The software algorithm is written in MS BASIC language.

Figure 10:
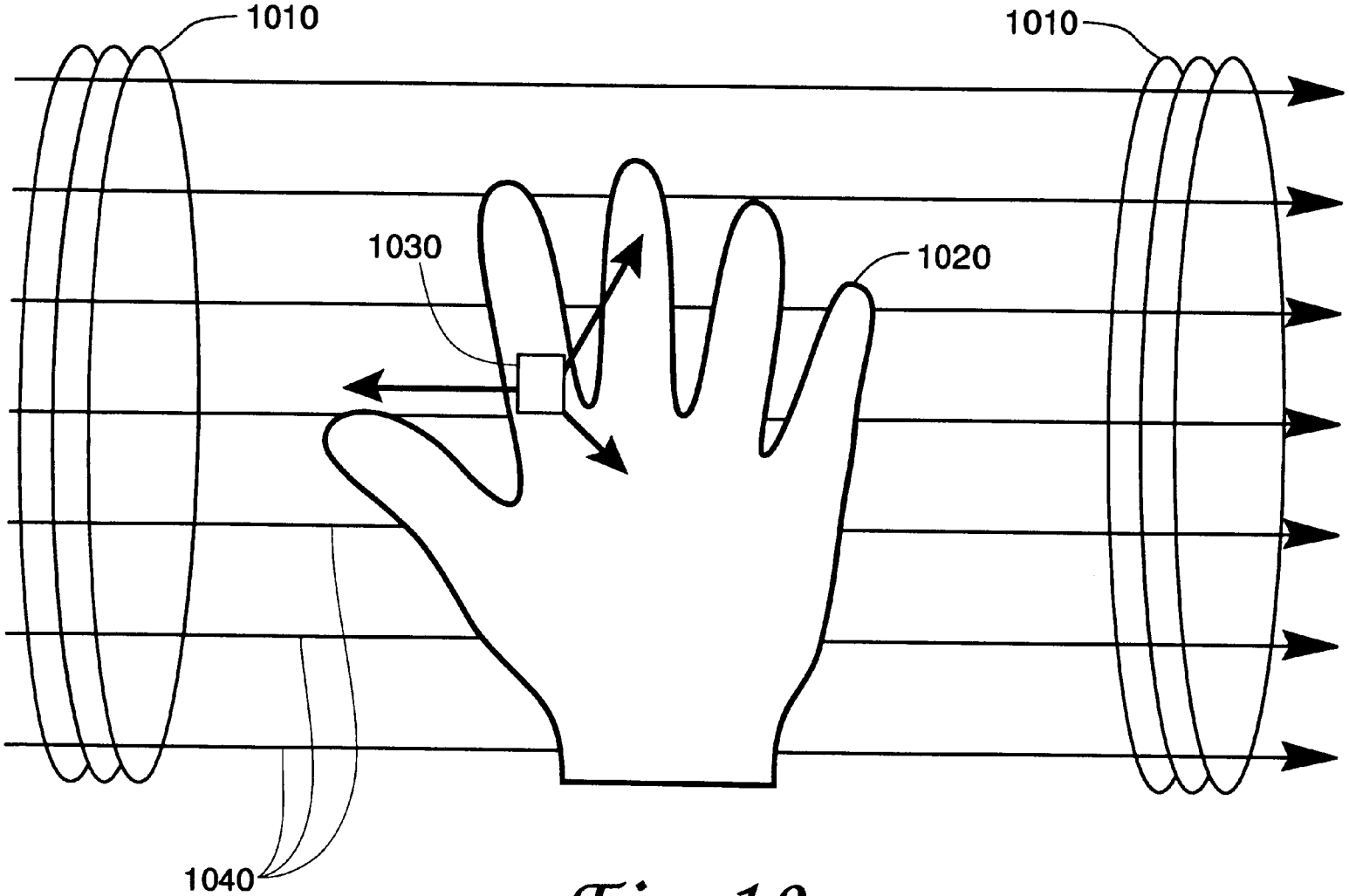
FIG. 10 shows a Helmholz coil generated magnetic field in accordance with the invention.

The FIG. 10 arrangement of the invention uses a Helmholz type coil to generate a first, constant, stationary magnetic field. The Helmholz coils are shown at 1010 in FIG. 10 and the glove-type device is shown at 1020. The Helmholz coil is known in the art and has the unique ability to produce an electromagnetic field which is very uniform and homogeneous. The flux lines of the magnetic field generated by the Helmholz coil are shown at 1040. After the electromagnetic field 1040 is maintained constant, the glove-type device 1020 is then inserted into the field, the glove-type device appended with a three-dimensional force actuator shown at 1030. In relation to the DC motor example, the Hehmholz coil acts as a stator and the three dimensional force actuator 1030 equates to the rotor device.

Figure 11:
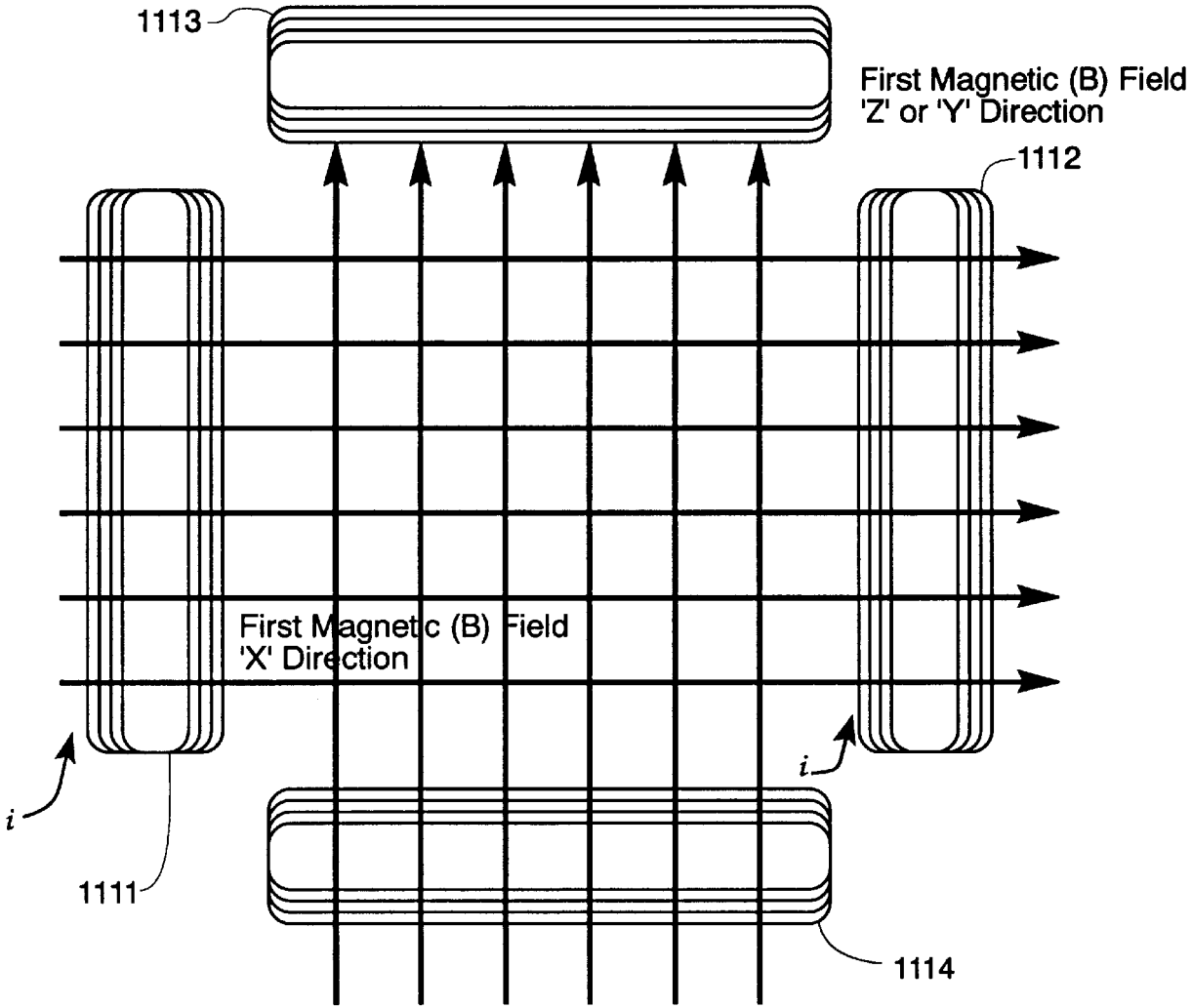
FIG. 11 shows Helmholz coil generated magnetic fields in two planes.

Another possible arrangement for generating a more than one constant, stationary electromagnetic field is by using two Helmhotz coil generated magnetic fields at right angles to each other as shown in FIG. 11. Such an arrangement allows for non-linked magnetic field force generation in more than one plane. In FIG. 11, a first constant electromagnetic field is generated between Helmhotz coils shown at 1111 and 1112 with the associated magnetic flux lines flowing in the "X" direction on the world coordinate system. A second electromagnetic field, perpendicular to the first electromagnetic field is generated between Helmhotz coils shown at 1113 and 1114 with the associated magnetic flux lines flowing in the "Y" direction on the world coordinate system. If the magnetic fields of FIG. 11 are pulsed on and off sequentially every millisecond, it is possible to generate non-linked magnetic field forces in more than one plane on, for example, a glove-type device inserted within the magnetic fields, in a similar manner as force generation accomplished in a single plane.

Figure 8:
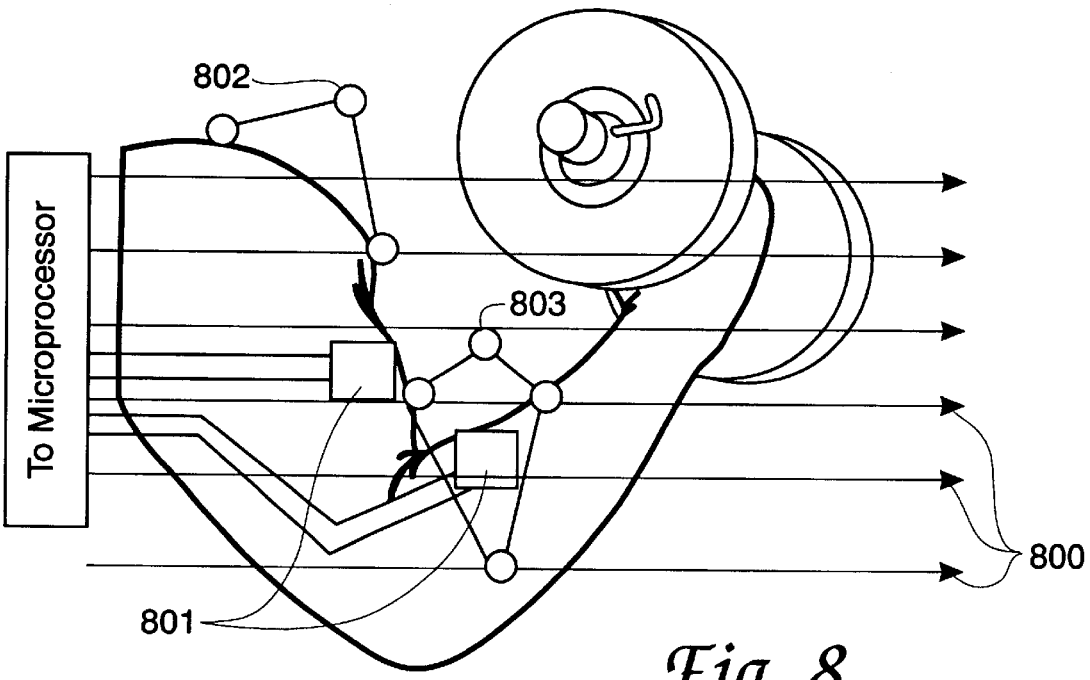
FIG. 8 is a shoulder-to-arm force emulator system in accordance with the invention.

There are various ways to determine the actual orientation of the human subject's body part, the hand in the arrangement of FIG. 2 that will receive a virtual reality force. The determination is not entirely different from having a global positioning system at each key joint of the human operator to determine the position and orientation of each respective coordinate frame in space. One method of determining position and orientation, commonly accomplished in the field of robotics is by measuring the changes of the joint angles and the lengths of the respective links making up the system. In FIG. 8, a shoulder-to-arm arrangement of the invention is depicted. The flux lines of the first, stationary, constant magnetic field are shown at 800, the force actuators are shown at 801 and goiniometers or position and orientation sensors are shown at 802 and 803. Simple trigonometric measurements of the arm system using goiniometeres 802 and 803 as shown in FIG. 8 are used to determine the joint angles.

Figure 8A:
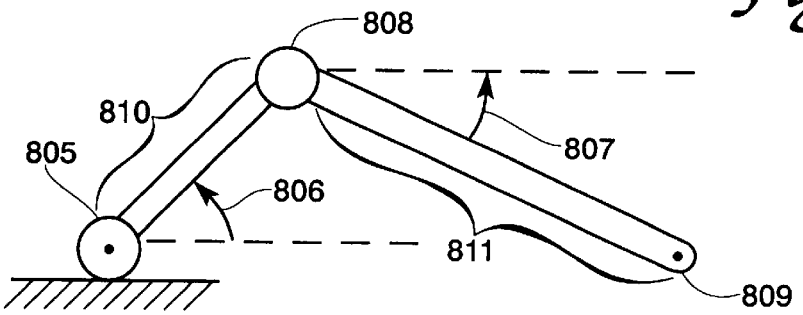
FIG. 8*a* is a diagram showing references for angular displacement in accordance with the invention.

FIG. 8*a* is a diagram of the angle relationships of the position sensors 802 and 803 in FIG. 8. The goiniometer has a fixed reference base as indicated at 805 in FIG. 8*a* and is the origin of the world coordinate system. The angles shown at 806 and 807 are each sensed via either a rotational potentiometer or an encoder, which counts the number of passing slots as the angle 806 changes. For example, a 10-bit encoder has $2^{10}$=1024 slots and for a full rotation of 360 degrees, the degree change per slot is 360 degrees divided by 1024 which equals 0.352 degrees per slot. Thus, the angle: 806 and 807 in FIG. 8*a* can be sensed as they change. Similarly, the lengths shown, at 810 and 811 are also known as shown in the algorithm of the microprocessor, attached as Appendix A. Thus in FIG. 8*a,* the point shown at 809 can be y-axis located with respect to the origin at point 805 by the length represented at 810 multiplied by the sine of angle 806 and adding the product of the length represented at 811 multiplied by the sine of angle 807. Similarly, the x-axis position change of point 809 relative to the origin at point 805 can be determined by multiplying the length represented at 810 by the cosine of the angle at 806 and adding the product of the length represented at 811 by the cosine of the angle at 807. Therefore, the microprocessor contains an algorithm to locate the point at 809 representing the human subject's body part, relative to the origin at point 805, utilizing only the lengths represented at 810 and 811 and the measurement of angles 806 and 807. The joint angles can be sensed by devices other than goiniometers and the art has demonstrated alternative means such as potentiometers and magnetic devices for achieving this objective.

Knowing the location of point 809 in FIG. 8*a,* or the human subject's body part, relative to the origin at 805 allows the microprocessor to then generate a current in the windings of the force actuators, which in turn produces, a proportionately valued electromagnetic field. An electromagnetic field of appropriate polarity local to the human subject and having a lower strength than the static, stationary electromagnetic B field will result in the B field repulsing the field local to the human subject resulting in a feeling of force on the human subject. The field B at 800 in FIG. 8 is constant, however, the local field at 801 may vary with time, producing a force reflected on the human, which varies with time. The variation of the forces produced at 801 will change depending on the position and orientation of the human arm. It is, therefore, the operation of the microprocessor to track the orientation of the force actuators as well as to coordinate their relative movement. The microprocessor will allow the gradual changes in forces such that the human operator does not experience sudden or abrupt force changes.

The inputs and outputs required for the microprocessor to work include all joint lengths and prior knowledge of the link lengths. As shown in FIG. 8*a,* each position sensor has a reference point and the goal is to track the position of the most distal point, point 809 in FIG. 8*a.* One method for accomplishing this task is to use the Denavit-Hartenberg (hereinafter "D-H") method. The D-H method involves using a matrix, which keeps track of both position, and orientation changes as the human subject moves and rotates through space. The D-H matrix is of the form $$ {}^{A}_{B}T = \begin{bmatrix} R & P \\ 0, 0, 0 & 1 \end{bmatrix} \qquad \text{Eq. 4} $$

where R is a 3×3-rotation matrix, and P is a 3×1 column vector which tracks the change in position. The 4×4 matrix ${}^{A}_{B}T$ tracks the change in position when the system moves from frame A to frame B. Appendix A illustrates representative software in MS BASIC to show a simple example in implementation.

Figure 5:
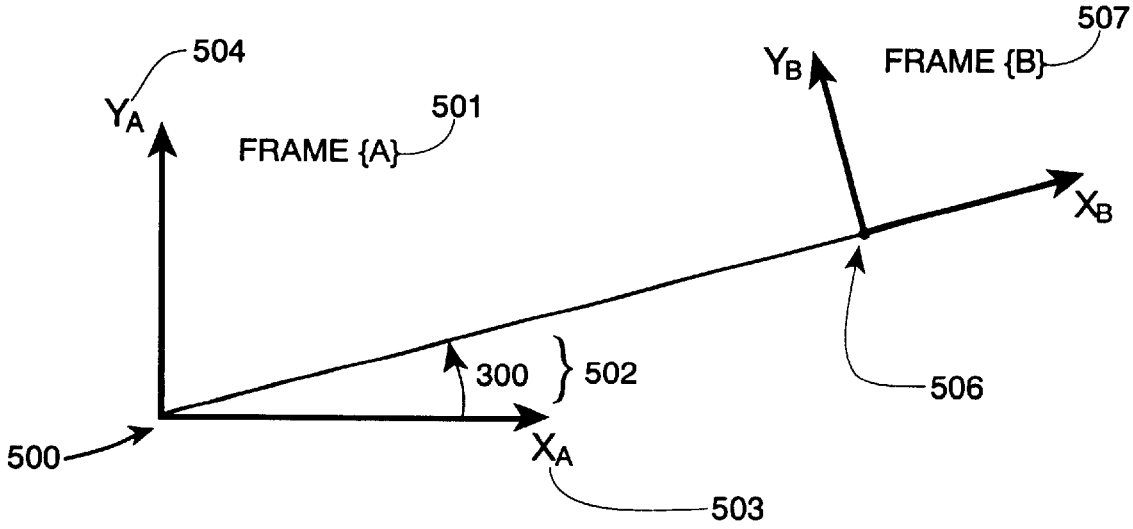
FIG. 5 is a glove type apparatus immersed in an electromagnetic field in accordance with the invention.

FIG. 5 illustrates how both position and orientation can be tracked using a D-H matrix. A system is originally in frame A, shown at 500 and identified at 501 in FIG. 5, and is rotated and translated to frame B at 506 and identified at 507 by a 30 degree rotation, such angle shown at 502, about the Z axis of frame A and translated 4 units in the $X_A$, 503, direction and 3 units in the $Y_A$ 504, direction. The D-H matrix corresponding to FIG. 5 is $$ {}^{B}_{A}T = \begin{bmatrix} A_B R^T & -{}^{A}_{B}R^{T\,A}P_{BORG} \\ 0, 0, 0 & 1 \end{bmatrix} \quad \text{Eq. 5} $$

$$ \text{where } {}_{A_B}R^T = \begin{bmatrix} c\theta_z & s\theta_z & 0 \\ -s\theta_z & c\theta_z & 0 \\ 0 & 0 & 1 \end{bmatrix} \quad \text{Eq. 6} $$

where $c\theta_z$ and $s\theta_z$ are short hand notation for cosine and sine of the angle $\theta_z$. The vector ${}^{A}P_{BORG}$ is given by col[4,3,0] and $$ {}^{B}_{A}T = \begin{bmatrix} 0.866 & 0.5 & 0 & -4.964 \\ -0.5 & 0.866 & 0 & -0.598 \\ 0 & 0 & 1 & 0 \\ 0 & 0 & 0 & 1 \end{bmatrix} \quad \text{Eq. 7} $$

The result shown in Eq. 7 is called forward kinematics. To determine inverse kinematics, compute ${}^{A}_{B}T$ by inverting the matrix of Eq. 7. In practice, the angles θ are measured, the rotation matrix is known, the $P_{BORG}$ matrix is determined using the known link lengths and ${}^{A}_{B}T$ or ${}^{B}_{A}T$ is calculated.

Thus, the D-H matrix keeps track of both the position and orientation change of a coordinate frame and can be used to track the point 809 in FIG. 8*a,* as an example. It is only required to know the link lengths and the angle changes to determine both the position and orientation of point 809.

To calculate the strength and size of the magnetic fields used in the invention, the first, constant, stationary magnetic field and the varying magnetic field local to the body part of the human subject, assume, as an example, a 0.2 pound force is desired. Studies in the art dealing with subjects involving force-reflecting devices generally have demonstrated that significantly less than one pound of force on the arm or hand over any period of time exceeding a few seconds is extremely instrumental in modifying limb motion trajectories. It is easier to consider this problem in SI (Systems International) units. Thus, 0.2 pounds of force =0.2/(0.2248 pounds/Newton) which is approximately equivalent to 1 Newton of Force.

Figure 9:
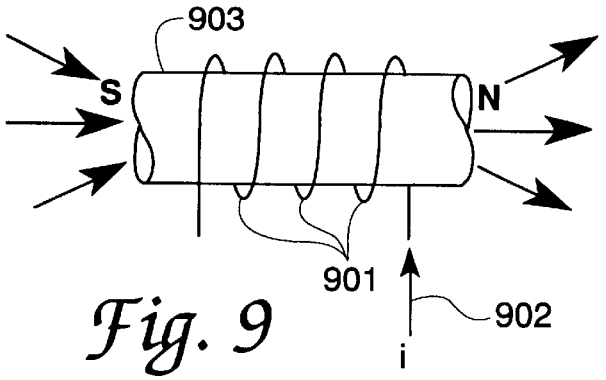
FIG. 9 is a diagram showing a solenoid with an associated electromagnetic field.

The equation $B=u_o i_o n$ may be used to determine the parameters of a solenoid capable of providing an external magnetic field B supporting this force of 1 Newton. FIG. 9 shows a typical solenoid with an external electromagnetic field where n is the number of turns 901 of wire on the solenoid shown at 903, i is the current in the solenoid as shown at 902, and u is the permeability of air $=4\pi\times10^{-7}$. Thus, as an example, a solenoid of 1 meter in length, 3 centimeters in diameter, which has 10 layers of windings of 850 turns each and carries a current of 10 amperes generates an external field of 0.11 Weber/meters$^2$. Note that a Weber is $10^8$ lines of force per square meter and levels of 0.1 Telsa (Webers/meters$^2$) is not considered hazardous by OSHA standards. After the external field B is established, the force can be determined that acts on the actuator via the relationship set forth in Eq. 2.

Figure 4:
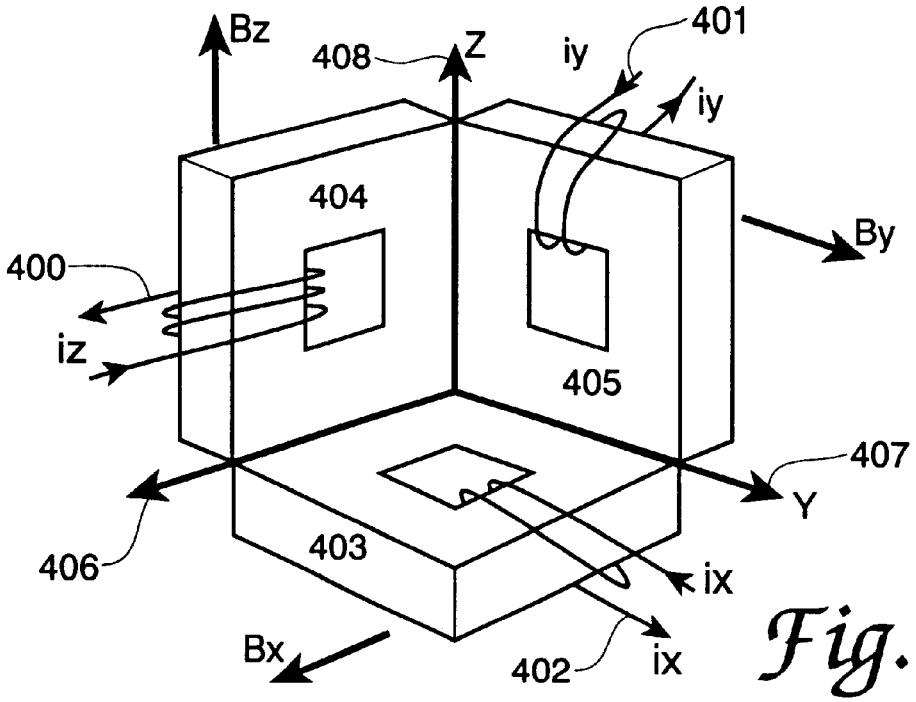
FIG. 4 is a schematic of an actuator element.

The unattached force emulating device and method of the invention may be accomplished in three dimensions, increasing the realism of the simulation. FIG. 4 illustrates a three-axis element for use in a three-dimensional force reflection paradigm. A three-axis coil element which can generate forces and moments in all three-dimensions is obtained by wrapping three coils, shown at 400, 401 and 402 in FIG. 4, about three ferrous metal cores shown at 403, 404 and 405 in orthogonal axis.

The three ferrous metal cores 403, 404 and 405 only touch each other at the X, Y and Z-axes, shown at 406, 407 and 408, respectively. At the intersections of the X, Y and Z-axes at 406, 407 and 408, the three ferrous metal cores are isolated from one another by a varnishing separator which provides high electrical resistance to eddy currents that may be induced yet permits the magnetic fields to be focused and concentrated in the ferrous material composing each ferrous metal core of the respective axis. Since each coil wrapping, 400, 401 and 402 is orthogonal to the other two axes, this provides independent control. The wires carrying the control current from the microprocessor to each of the orthogonal coils have currents $i_x$, $i_y$ and $i_z$ which give rise to their respective electromagnetic fields. One, two or three of the axes may be actuated simultaneously. It is not necessary to actuate every axes, only those necessary for creating the appropriate force vector. Accordingly, if a three-dimensional feeling of force is desired on the human operator, a microprocessor will be programmed to alter the currents 400, 401 and 402 and a feeling of force will be emulated against the electromagnetic fields local to each current. Such a three-dimensional force emulation is more realistic than force emulation in a single plane.

The actuating elements which produce the force locally on the glove device in FIG. 2 have the design in FIG. 4 for another reason involving the removal of heat in an efficient manner. Heat is removed in an efficient manner because heat generating electric currents have to run through the coils 400, 401 and 402 in order to generate the electromagnetic field and a feeling of force. The design in FIG. 4 reduces heat in an efficient manner by having each axes exposed to the air and separated in a spatial sense. This design allows for better conduction of heat from the device.

Figure 6:
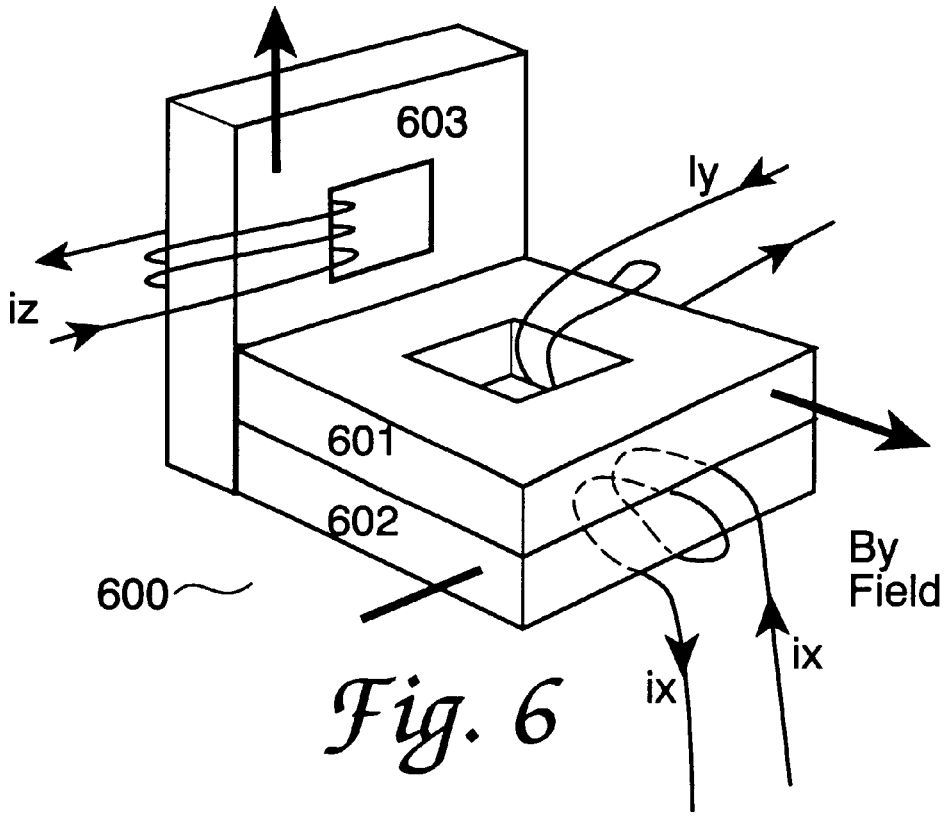
FIG. 6 is a schematic of a layered actuator element.

The three-dimensional force reflecting actuators can be further simplified as illustrated in FIG. 6. FIG. 6 shows a force actuator, 600 with two metal cores 601 and 602 on top of each other and at a right angle to metal core 603. In FIG. 6, the three-axis coil, 600, is put in a form that appears as a two-dimensional plane but effectively acts as like a three-dimensional actuator (as in FIG. 4). In FIG. 6, actuator bottom layers 601 and 602 are produced from material anisotropic in nature, that is, the magnetic properties of the material are more favored in one direction only as compared to isotropic materials in which magnetic properties are similar in all directions simultaneously. These properties of magnetic substances can be built into the material as the metal is formed and provides the directional vectors without the need for three-dimensional construction as depicted in FIG. 4.

Figure 7:
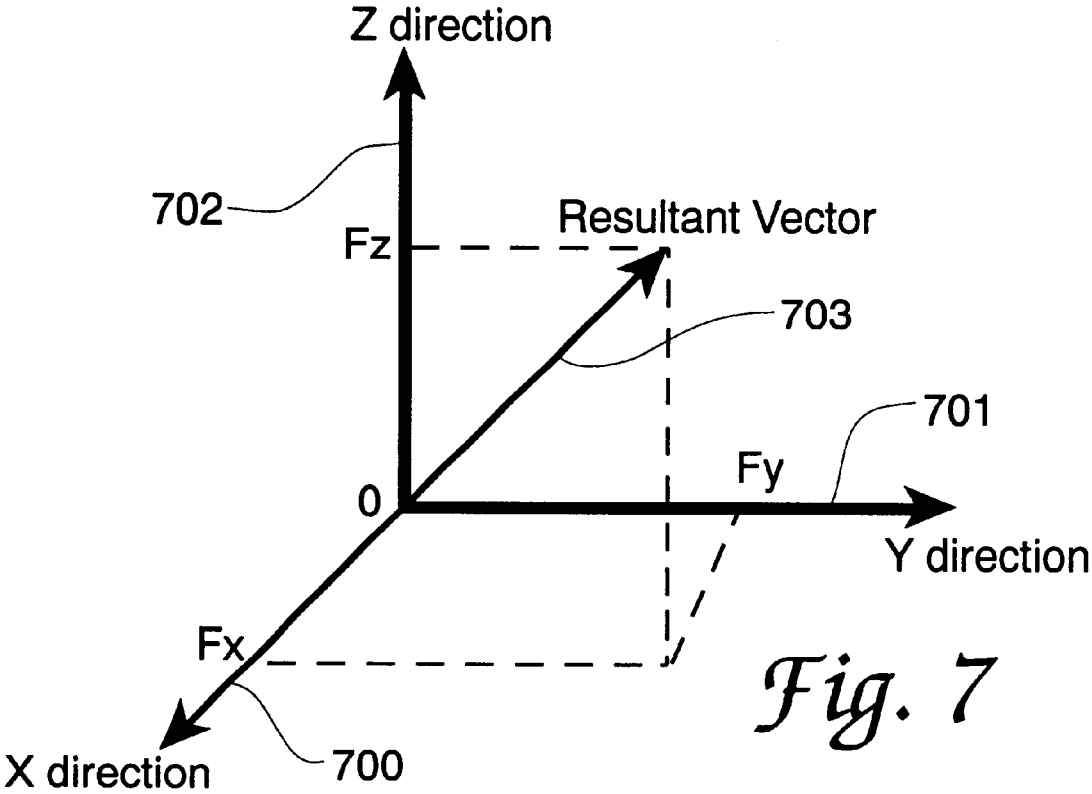
FIG. 7 is a diagram showing the geometry of force vectors.

This arrangement can be further understood by considering FIG. 7. FIG. 7 illustrates the three force vectors that result when actuated by these orthogonal electrical currents from the system in FIG. 4. From FIG. 7, in the x, y and z directions shown at 700, 701 and 702, respectively, it is known these vectors now have forces in their respective coordinate systems through the vector relationship $$ F_j = i_j L \times B \quad \text{Eq. 3} $$

Where the currents j=X,Y, or Z have been initiated by a microprocessor to the respective coils. By combining any two or more forces using Eq. 3, it is seen from FIG. 7 that force reflection can easily be accomplished in any arbitrary direction. A difficult task is for the microprocessor to keep track of the position and orientation of the force actuators on the human subject, a glove-type device in FIG. 2, and to coordinate their relative movement. With this information on the human subject, the hand in the arrangement of FIG. 2, the appropriate currents $i_x$, $i_y$, and/or $i_z$ can be generated to command the appropriate spatial force reflection paradigm.

The invention provides a more realistic feeling of force simulation than that available in the art by capitalizing on the concept of an "action at a distance" method of reflecting forces as opposed to the traditional Newton's third law concept of "action-reaction" with bodies in contact. The "action at a distance" concept is successfully employed by using electromagnetic fields and forces in three dimensions without the human operator being attached or linked to a reference source.

While the apparatus and method described herein constitute a preferred embodiment of the invention, it is to be understood that the invention is not limited to this precise form of apparatus or method, and that changes may be made herein without departing from the scope of the invention, which is defined in the appended claims.

We claim:

1. A non-linked method for providing a feeling of force to a human operator comprising the steps of:

generating a first, constant, stationary electromagnetic field;

sensing three-dimensional position and orientation of said human operator relative to said first, constant, stationary electromagnetic field;

communicating data from said sensing step to a microprocessing computing device;

generating an electric signal responsive to data from said communicating step;

producing a second, varying electromagnetic field local to said human operator responsive to said electrical signal from said generating step; and coupling a force generated by interaction of said first and second electromagnetic fields to said human operator.

2. The method of claim 1 for providing a feeling of force to a human operator wherein said generating step further includes the step of providing a helmhotz-coil generated electromagnetic field.

3. The method of claim 1 for providing a feeling of force to a human operator wherein said sensing step further includes the steps of:

establishing a coordinate system relative to said human subject; and sensing movement of said human subject by measuring angular and linear displacement of said human subject relative to said coordinate system.

4. The method of claim 1 for providing a feeling of force to a human operator further including the step of generating an electric signal in each of x, y and z coordinate axes.

5. The method of claim 3 for providing a feeling of force to a human operator, wherein said sensing step further includes the steps of:

mounting said human operator with position sensing equipment; and mounting said human operator with force actuating equipment.

6. The method of claim 4 for providing a feeling of force to a human operator, wherein said mounting said human operator with position sensing equipment further includes the step of mounting said sensing equipment on a glove type device on a hand of said human operator.

7. An non-linked system for providing a feeling of force to a human operator comprising:

a first, constant, stationary electromagnetic field generating apparatus;

sensing apparatus appended to said human operator for locating three-dimensional orientation of said human operator relative to said first, constant, stationary electromagnetic field;

a second electromagnetic field local to said human operator and responsive to three-dimensional position and orientation data of said human operator;

a computer apparatus capable of varying said second electromagnetic field to generate attractive and repulsive forces acting on said human operator in response to signals received from said sensing apparatus.

8. The system of claim 7 for providing a feeling of force to a human operator further including data communication means for communicating data from said sensing apparatus to said microprocessing computing device.

9. The system of claim 7 for providing a feeling of force to a human operator wherein said attractive and repulsive forces are generated by an electric signal.

10. The system of claim 7 for providing a feeling of force to a human operator further including a second electromagnetic field existing on x, y and z axis of a world coordinate system.

11. The system of claim 10 for providing a feeling of force to a human operator wherein said second electromagnetic field of three-dimensions comprises a first metal core in the x-plane of the world coordinate system having current carrying coils thereon;

a second metal core in the y-plane of the world coordinate system orthogonal to said first metal core having current carrying coils thereon;

a third metal core in the z-plane of the world coordinate system orthogonal to said first and second metal cores having current carrying coils thereon; and said current carrying coils of said first, second and third metal cores having a current running therethrough and generating an associated electromagnetic field that attract and repel said first electromagnetic field.

12. The system of claim 11 for providing a feeling of force to a human operator wherein said second electromagnetic field of three dimensions comprises a first core of anisotropic material in the x-plane of the world coordinate system having current carrying coils thereon;

a second core of anisotropic material in the x-plane of the world coordinate system having current carrying coils thereon;

a third metal core in orthogonal to said first and second metal cores having current carrying coils thereon; and said current carrying coils of said first, second and third metal cores having a current running therethrough and generating an associated electromagnetic field that attract and repel said first electromagnetic field.

13. The system of claim 7 for providing a feeling of force to a human operator wherein said sensing apparatus further comprises:

means for establishing a coordinate system relative to said human subject; and sensing means for sensing movement of said human subject by measuring angular and linear displacement of said human subject relative to said coordinate system.

14. The system of claim 13 for providing a feeling of force to a human operator wherein said sensing means further includes:

goiniometers for sensing position of said human subject; and force actuators for sensing three -dimensional orientation of said human subject.

15. The system of claim 13 for providing a feeling of force to a human operator wherein said sensing means further includes a glove-type device for mounting said goiniometers and force actuators on the hand of said human operator.

16. The system of claim 8 for providing a feeling of force to a human operator wherein said electromagnetic devices are externally powered.

17. An untethered system for providing force virtual reality to a human operator comprising:

a first, constant, stationary electromagnetic field;

externally powered sensing apparatus appended to a glove-type device on a hand of said human operator for determining three-dimensional angular and linear orientation of said hand of said human operator relative to said first, constant, stationary electromagnetic field;

a second electromagnetic field local to said human operator and responsive to three-dimensional angular and linear orientation data of said hand of said human operator;

a microprocessing computing device operative to receive and generate data to vary said second electromagnetic field to generate attractive and repulsive forces between said first and second electromagnetic fields which direct a force on said human operator.

* * * * *